United States Patent [19]

Churnside et al.

[11] Patent Number: 5,159,407
[45] Date of Patent: Oct. 27, 1992

[54] SINGLE-ENDED DUAL SPATIAL FILTER DETECTOR FOR THE PASSIVE MEASUREMENT OF WINDS AND TURBULENCE ALOFT

[75] Inventors: James H. Churnside; Steven F. Clifford, both of Boulder, Colo.; Steen G. Hanson, Fakse, Denmark

[73] Assignee: The United States of America as represented by the Secretary of Commerce, Washington, D.C.

[21] Appl. No.: 589,749

[22] Filed: Sep. 28, 1990

[51] Int. Cl.$^5$ .............................................. G01B 9/02
[52] U.S. Cl. .................................. 356/354; 356/353; 356/361
[58] Field of Search ................ 356/354, 353, 359, 361

[56] References Cited

U.S. PATENT DOCUMENTS

| | | | |
|---|---|---|---|
| 3,567,324 | 3/1971 | Brooks | 356/361 |
| 3,923,400 | 12/1975 | Hardy | 356/354 |
| 4,210,400 | 7/1980 | Misek | 356/359 |
| 4,465,372 | 8/1984 | Geary | 356/359 |

OTHER PUBLICATIONS

"Interferometry Based on the Lau Effect", Bratelt et al., Optics Communications, Sep. 1979, pp. 268-274.

Primary Examiner—Samuel A. Turner
Attorney, Agent, or Firm—Ronald Charles Williams; Diana M. Cox

[57] ABSTRACT

The disclosed invention is a measurement device for use in determining wind turbulence in the atmosphere, such as the cross-wind velocity and strength of refractive turbulence in a localized region. In the preferred embodiment, the device is comprised of: a telescope for collimating the light received from the light source, the telescope placed in front of a pair of spatially filtered optical receivers and focussed at infinity; a pair of gratings; a collecting lens, placed behind the gratings to collect the spatially filtered light; a photodetector to collect the light; an amplifier to amplify the signal received from the photodetector, and; a spectrum analyzer to analyze the interference pattern created by the gratings. The device uses the information contained in the light as it is scattered into its various Fourier components as the light passes through the atmosphere. This information, by means of the two filters, is processed to determine the turbulence, whose wavenumber is the difference of the spatial filter wavenumber of the first and the second spatial filters.

6 Claims, 2 Drawing Sheets

SINGLE-ENDED DUAL SPATIAL FILTER DETECTOR FOR THE PASSIVE MEASUREMENT OF WINDS AND TURBULENCE ALOFT

BACKGROUND OF THE INVENTION

The present invention relates to the field of wind shear devices and in particular to optical devices to measure wind shear of winds aloft. In the art of measuring winds at altitudes above the earth, it is well known to use spatial filtering.

The performance of optical systems in the atmosphere is generally affected by refractive turbulence along the path of the beam's propagation. For example, the resolution of earth-based astronomical telescopes is often limited by wind turbulence near the location of the telescope, usually at ground level. However, fading in a space-to-ground optical communication link is usually affected by turbulence higher in the atmosphere. Accordingly, an understanding of vertical profiles of turbulence strength $C_n^2$ would allow the performance of all types of atmospheric optical wind turbulence measuring systems to be properly modeled. Additionally, the presence of atmospheric turbulence signifies turbulent mixing of air masses of different temperatures. High resolution vertical profiles of $C_n^2$ would advantageously provide insights into atmospheric dynamics not otherwise measurable.

In 1964, W. M. Protheroe used spatially filtered scintillations of starlight to obtain the velocity of a layer of refractive turbulence at an altitude of about 10 kilometers. A. A. Townsend later extended his analysis to infer the depth of this layer and the magnitude of the temperature fluctuations, which is related to the strength of turbulence. Liang-chi Sten used this type of inversion to convert millimeter-wave data and obtain profiles of turbulence along a 28 kilometer terrestrial path. However, the spatial resolution of this technique was rather poor. Shen concluded that the resolution in his case was limited to about ¼ of the path.

In addition, a number of theoretical studies have considered inversion of the expression for the spatial co-variance of stellar scintillations to obtain vertical profiles of turbulence strength $C_n^2$. J. Vernin and F. Roddier and Ochs et al. used spatial filtering of stellar scintillations to infer $C_n^2$ profiles. The spatial resolutions in these reports were also rather poor. In J. Vernin and F. Roddier, two turbulent layers were identified. In Ochs et al. seven somewhat large overlapping resolution cells were reported.

A. Rocca, F. Roddier and J. Vernin used a crossed-path scintillation technique with double star sources as the light source. However, they were still able to only identify only three turbulent layers in the atmosphere.

Another patent of interest is U.S. Pat. No. 4,652,122, is entitled "Gust Detection System" and issued to Zincone at al on Mar. 24th, 1987. This patent discloses a method of detecting air turbulence in the air space in advance of an aircraft by scanning the beam of a variable-focal distance laser airspeed unit close-in to the aircraft. The measurement is taken to determine aircraft airspeed and angle of attack, and scanning the beam at distances farther out from the aircraft and measuring airspeed. Discrepancies between the close-in measurement and the farther out measurement are quantifiably indicative of air turbulence. This patent requires the use of two beams. It would be advantageous if measurements could be taken using a single beam.

Doppler radar is capable of measuring a height distribution of wind velocity on the basis of Doppler frequencies of scattered waves produced by the atmospheric turbulence. Of interest in this regard is U.S. Pat. No. 4,761,650, is entitled "System For Measuring Height Distributions Of Atmospheric Temperature, Wind Direction And Wind Speed" and issued to Masuda et al, on Aug. 8th, 1988. This invention discloses a system for measuring height distributions of atmospheric temperature and wind velocity (wind direction and wind speed) using Doppler radar. This disclosure uses the fact that a sound wavefront in the atmosphere constitutes part of an ellipsoidal surface and that there always exists a normal which passes through an interior point of that ellipsoid.

The radar and acoustic generator are arranged on a straight line in the wind direction, so that a radio wave from the radar is directed to the wavefront of a sound wave from the generator. The radar antenna beam is scanned so that it perpendicularly intersects the sound wavefront. The speed of the sound wavefront is measured from the Doppler frequencies of reflected waves. The sound speed is obtained by removing the wind speed component from the measured speed of the sound wavefront. The sound speed obtained is calculated in terms of atmospheric temperature, thereby obtaining the height distribution of the atmospheric temperature. However, one problem with this technique, is that there is a requirement that a specific, specialized, transmission source is required.

Measuring of the wind velocity is also taught in U.S. Pat. No. 4,558,594, entitled "Phased Array Acoustic Antenna", and issued to Balser et al on Dec. 17th, 1985. This disclosure teaches a system that operates from ground level for remote measurement of wind velocity in the atmosphere. An array of acoustic transducer elements are provided which transmit a beam of acoustic energy along a path and thereafter receive such transmitted energy as scattered by turbulence in the path.

In Balser et al the system includes signal transmitting means for driving the arrays, and signal receiving means, with a switching system for connecting the elements of the array to the transmitting means and to the receiving means. The system operates as a monostatic system. Phase control for the transmitted signals is comprised of phase shifters and switches for selectively connecting driving signals to the elements of the array for driving selected elements at different phases. This produces, from a single antenna, a first, second and third beams, in sequence at three different predetermined angles.

Interferometer techniques have also been used to measure wind velocity aloft. U.S. Pat. No. 4,465,372, is entitled "Turbulence Measurement Interferometer Apparatus" and issued to Geary on Aug. 14th, 1984. This disclosure teaches a turbulence measurement interferometer apparatus which includes a station having an entrance pupil and an aerodynamically stable boom which is connected to the station. The station houses an optical mirror arrangement which defines an optical axis which extends through the entrance pupil. The boom has an end point spaced from the station but disposed on the optical axis.

A laser is used to generate a low power beam which is split into a first and a second portions. The first portion is guided to the boom end point and launched therefrom as a spherical wavefront through turbulence in front of the entrance pupil and toward the mirror arrangement, which in turn transforms it into an object collimated wavefront. The second portion of the beam is transformed into a second collimated reference wavefront which is combined with the first collimated wavefront and produces an interference pattern which is recorded on a medium, such as a photographic plate. The interference pattern provides information on the turbulence structure present at the entrance pupil of the station.

Of interest also in wind velocity detection is U.S. Pat. No. 4,351,188, entitled "Method And Apparatus For Remote Measurement Of Wind Direction And Speed In The Atmosphere", and issued to Fukushima et al, on Sep. 9, 1982. This reference discloses a device wherein an acoustic wave source and a radio wave source are installed close to each other on the ground. When an acoustic wave pulse is transmitted vertically into the atmosphere by the acoustic wave source, spherical wavefronts formed in the atmosphere by the acoustic wave are propagated upward at the velocity of sound.

U.S. Pat. No. 4,649,388 is entitled "Radar Detection Of Hazardous Small Scale Weather Disturbances", and issued to Atlas on Mar. 10th, 1987. In this invention, the detection and warning of microbursts, low level wind shear and other weather disturbances, which are hazardous to aircraft operations and to the public at large, are accomplished with either an airport surveillance radar (ASR) or a multi-beam Doppler radar. ASR Doppler systems normally operate to receive one of two relatively large vertical fan beams having different elevation angles but which overlap one another so that they have equal gains at an elevation angle, called the null, at a relatively low angle. Below this null, the low beam antenna gain exceeds that of the high beam, and conversely above it. Accordingly, by subtracting the high beam Doppler spectrum from that on the low beam, a Difference Doppler Spectrum (DDS) is produced which is positive below the null and negative above. The velocity bounds of the positive portion of the DDS provide the wind speed components at the null and at heights near the surface. These wind speed components are then utilized to measure and map radial and horizontal shear, the boundaries of the disturbance and other signatures such as vertical shear and turbulence and the rate of change of all the parameters, thereby permitting the detection of the location and track of the disturbance.

Of interest also is U.S. Pat. No. 4,552,016, is entitled "Sensor For Currentmeter", and issued to Suyama on Nov. 12th, 1985. In this disclosure, a sensor for a currentmeter is taught. A sensor for a currentmeter includes a supporting member which is provided to support a pair of transmitter/receiver units which rotate around an axis that is not parallel to a transmission path of supersonic waves which propagate between the units. Sing-around signals which are transmitted correspond to each rotating position of the supporting member. Since only one pair of transmitter/receiver units is required, current turbulence caused by the supporting member is reduced so that a highly precise measurement of the current flowing between the pair of transmitter/receiver units may be obtained. Again, the prior has required the use of a pair of beams to measure the velocity.

In some of the prior art references, the measurement tool must be directly in the path of the wind to be measured. In U.S. Pat. No. 4,631,958, entitled "Force-balance Drag Anemometer", and issued to Van Cauwenberghe et al on Dec. 30th, 1986, an anemometer is for use in measuring two orthogonal velocity components of a fluid, such as air or water is disclosed. When used to measure wind speed, the wind force acting on a sphere attached to a shaft tends to deflect the shaft from the neutral position. This deflection is measured by optical or electromagnetic sensors which control an electromagnetic actuator which generates a force opposing the wind force thereby returning the shaft to the neutral position.

The actuator generates a force proportional to the square of the current applied to the actuator coils. Since the drag force is proportional to the fluid velocity squared (for one dimensional measurement), the wind speed measurement derived from the current applied to the electromagnet will be partly linearized. A microprocessor is used to compute the wind speed components or the wind speed and its direction from the electromagnet signals. This invention is included to identify a representative sample of those mechanical inventions utilized to sample the wind velocity and turbulence. In this device, the measurement tool must be placed directly in the path of the wind to be measured. It would be an improvement to have the measurement taken from a remote location from where the device is located.

Of interest in wind measurement also is U.S. Pat. No. 4,635,474, entitled "Method And Apparatus For Wind Direction And Speed In Spatial Determination By Magnus Effect", and issued to Blackwood on Jan. 13th, 1987, wherein a cylinder is rotated about its vertically mounted axis with alternative provision for a horizontally mounted sphere affixed to its top. The superposition of the circulatory air flow thus created around the cylinder, and the fluid stream vector, results in a definitive and measurable lift via the Magnus effect. The orthogonal force thus generated totally identifies the horizontal component of the spatial fluid vector; and its vertical component can be determined from a similar effect on the sphere.

The sensitivity of the device can be enhanced by increasing the rotation rate; and may be further augmented by employing a second similar device with its rotation in the opposite sense to that of the first. By this expedient, it is also possible to reduce the system to a purely deterministic system by the cancellation of the effects of drag and platform motion. In addition, the device is intrinsically resilient to the otherwise detrimental effects of rainfall, temperature and pressure variations. Its sensitivity can be critically controlled to meet the particular operating circumstance. This makes the device suitable for applications in turbulent and fast changing wind conditions.

Such remote measurement is taught in U.S. Pat. No. 4,735,503, is entitled "Method For Determining The Direction And Speed Of Wind In The Atmosphere", and issued to Werner et al on Apr. 5th, 1988. In this reference, a method and device is disclosed which provides a means for determining the direction and speed of wind in the atmosphere by means of a laser-Doppler anemometer, wherein only values measured in a sector of about 100 degrees and less of an azimuth scan are supplied or fed to a multiple-peak finder of a measuring device.

In order to attain a high processing speed, flowing differentiation takes place by means of digitally operating systems. In order to eliminate the influences from clouds, haze, fog and the like in the measuring device, several frequency maximums are always traced in the multiple-peak finder, whereby in each case a preceding maximum is related to a trailing maximum until the trailing maximum is smaller than the preceding maximum.

Because of the attainable high-speed sector scanning, the measuring device can be used for the determination of multiple wind peaks caused by clouds and/or fog echoes, or at an installation site where the measuring range is highly restricted, or also for detecting aircraft wake vortices.

U.S. Pat. No. 4,099,878 issue Jul. 11, 1978, wherein an apparatus and method employing line-of-sight wave propagation for measurement of various quantities such as velocity and refractivity structure of a transmission medium at selected locations remote from the measuring device, is disclosed.

While extensive work has been done in the area of spatially measuring wind velocity aloft, none of the references discussed references the use of paired spatially separated filters in the receiver to measure velocity in the atmosphere or any other similar transmission medium.

One primary advantage of the present invention is that a single source of radiant energy may be used to measure the wind velocity. Another advantage of the present invention over the prior art is the fact that any number of different light sources may be used and in particular that the light source need not be coupled to the receivers. Additionally, relatively accurate turbulence estimates are possible with the present invention.

It is an object of this invention to provide a means of measuring winds aloft using light sources of different wave lengths.

It is another object of the present invention to provide a means of measuring using a single energy source.

It is still yet another object of the present invention to provide a means for remotely measuring winds aloft using a single radiant energy source.

BRIEF SUMMARY OF THE INVENTION

The disclosed invention is a measurement device for use in determining wind turbulence in the atmosphere, such as the cross-wind velocity and strength of refractive turbulence in a localized region. In the preferred embodiment, the device is comprised of: a telescope for collimating the light received from the light source, the telescope placed in front of a pair of spatial filters and focussed at infinity; a pair of gratings; a collecting lens, placed behind the gratings to collect the spatially filtered light; a photodetector to collect the light; an amplifier to amplify the signal received from the photodetector, and; a spectrum analyzer to analyze the interference pattern created by the gratings.

The present invention uses the information contained in the light as it is scattered into its various Fourier components as it passes through the atmosphere. This information, by means of the two filters, is processed to determine the turbulence, whose wavenumber is the difference of the spatial filter wavenumber of the first and the second spatial filters.

The measurement volume is located at a distance from the receiver determined by the grating wavenumbers and their separation.

DETAILED DESCRIPTION OF THE PREFERRED EMBODIMENT

The disclosed invention is a measurement device 1 for use in determining wind turbulence in the atmosphere, such as the cross-wind velocity and strength of refractive turbulence in a localized region.

In the present invention, any number of different wave transmitters, such as, radio and acoustic waves, may be used. However research has indicated that optical transmitters may be advantageously used. As a result of all the filtering being accomplished at the receiving point by the receivers, a wide range of optical transmitters may be used, including without limitation, a laser, a thermal source, a collimated thermal source, the sun the moon, a planet, a star or any other natural or artificial source of light.

While the present invention may use a wide spectrum of energy sources, for ease of understanding, optical beams will be illustrated. However, it is expressly stated that the utility of the invention is not limited to such optical transmitters.

Figure 1:
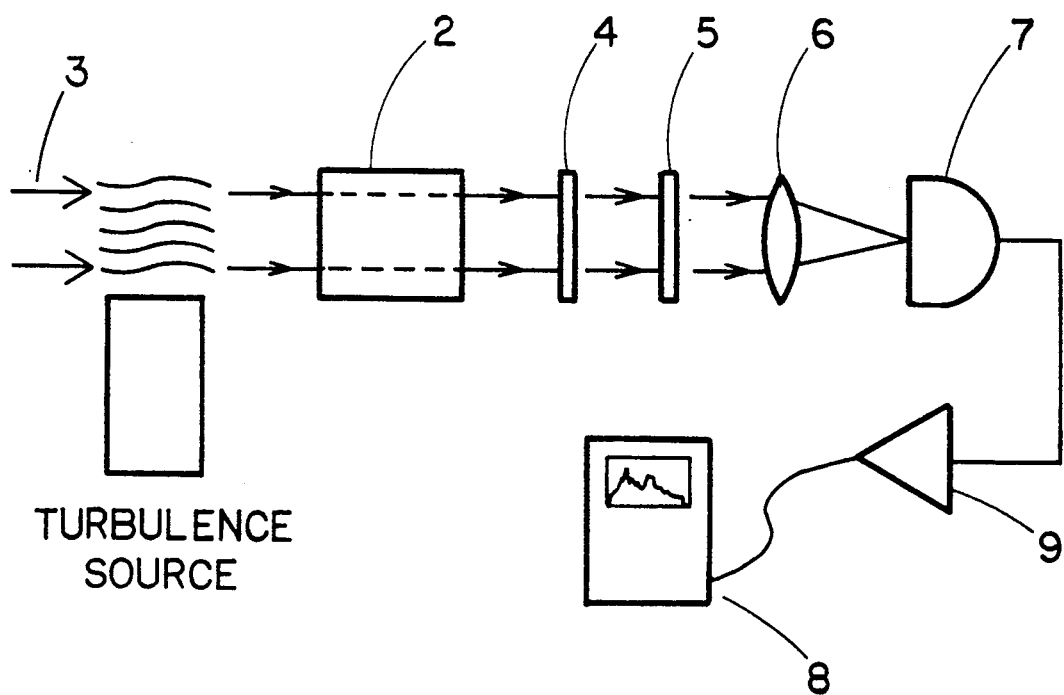
FIG. 1 is a block diagram of the components of the present invention.

In the preferred embodiment, as shown in FIG. 1, the device is comprised of: a telescope 2 for collimating the light 3 received from the a distant light source, the telescope 2 focussed at infinity; a pair of gratings 4 and 5, said gratings 4 and 5 placed behind the telescope 2; a collecting lens 6 placed behind the gratings 4 and 5 to collect the spatially filtered light 6; a photodetector 7 to collect the light 6; an amplifier 7 to amplify the signal received from the photodetector 7, and; a spectrum analyzer 8 to analyze the interference pattern created by the gratings 4 and 5.

By way of theoretical explanation, the device 1 uses the information contained in the electromagnetic wave as the wave is scattered into its' various Fourier components as the wave passes through the atmosphere. The Fourier components, by means of the two filters, are processed to determine the turbulence, whose by means of the two filters, are processed to determine the turbulence, whose wavenumber is the difference of the spatial filter wavenumber of the first and the second spatial filters.

Figure 2:
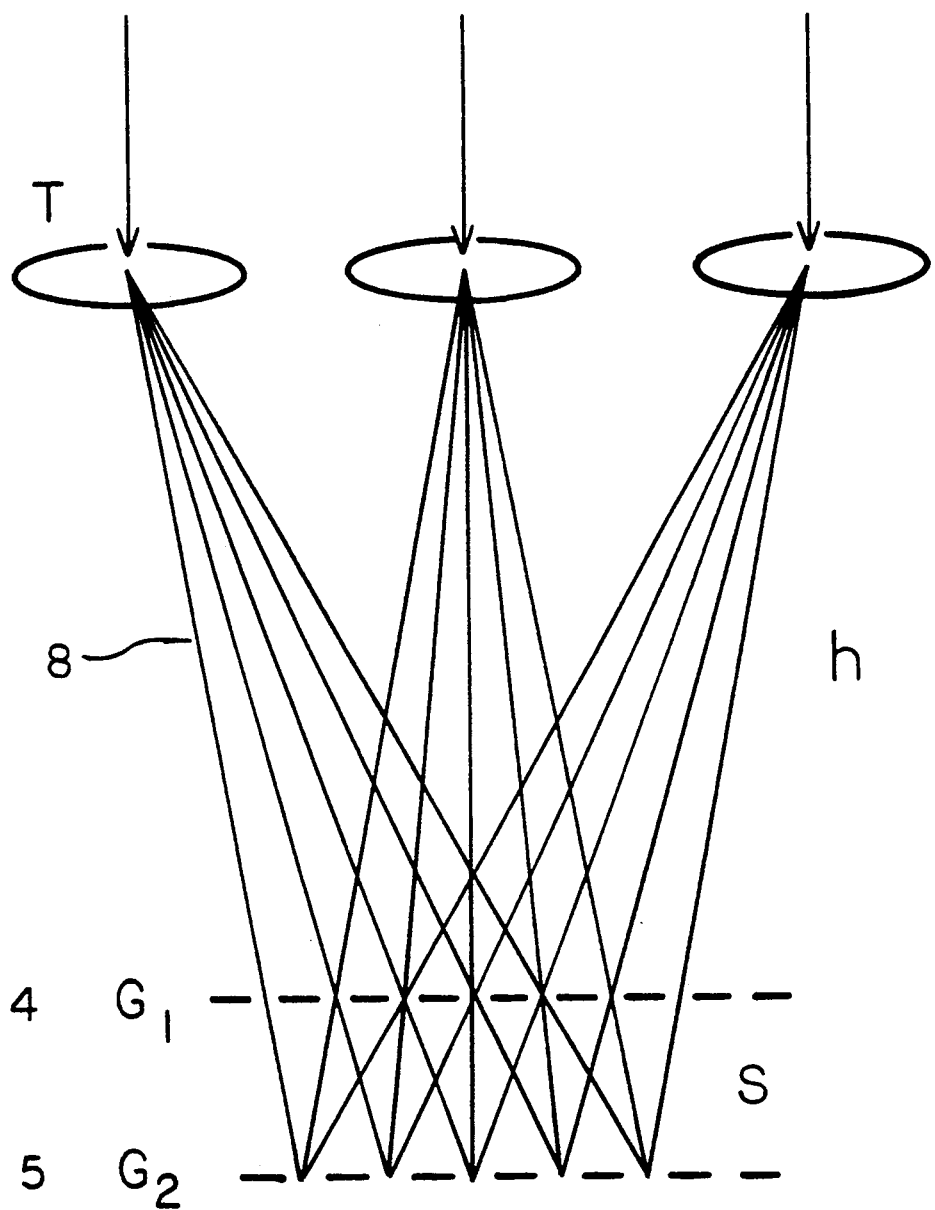
FIG. 2 is a schematic diagram of the rays from the gratings.

The general operation of the double spatial filter can be described using a ray tracing approach. As shown in FIG. 2, two spatial filters 4 and 5 are shown as alternating clear and opaque regions of equal width. The filters are separated by a distance "s". At a height "h" above the gratings 4 and 5, the telescope 2 is located. It is assumed that a periodic scattering structure T with a period $\lambda_T$ is generated. This structure is one of the Fourier components of the random refractive index field that is herein named "refractive turbulence".

Light from the distant source (not shown) propagates through the atmosphere and is scattered by each Fourier component of turbulence. As shown in FIG. 2, the ray paths 8 are scattered by one such component and pass through the clear regions of both spatial filters, i.e. gratings 4 and 5. Consider now two adjacent rays 8 that start on one cycle of the scattered. At a distance h, the rays 8 are separated by a distance $\lambda_1$, the period of grating 4. At a distance h+s the rays 8 are separated by $\lambda_2$. Therefore, assuming that the angle $\theta$ between the two rays 8 is much less that one radian, we see that:

$$\theta = \frac{\lambda_1}{h} = \frac{\lambda_2}{h+s}$$

In a similar manner, consider two adjacent rays that come together at one cycle of grating 5. At a distance "s" in front of grating 5, the rays are separated by $\lambda_1$ and, at a distance h+s, the are separated by $\lambda_T$. Therefore, the angle $\phi$ between these two rays is $$\phi = \frac{\lambda_1}{s} = \frac{\lambda_T}{h+s}.$$

From these two conditions, it is straightforward to show that $$K_T = K_1 - K_2$$

and $$h = \frac{K_2}{K_1 - K_2} s$$

where K is the wavenumber $2\pi/\lambda$ corresponding to each period $\lambda$.

To get an estimate of the spatial resolution of this system, consider a receiver aperture of diameter D that contains $N_1$ cycles of grating $G_1$. Note that in this specification spatial resolution is denoted by $\Delta h$, so that the upper and lower limits of the measurement volume are at $h \pm \frac{1}{2}\Delta h$. Those limits are defined in the following manner. Rays 8 from a point at height "h" project an image of $G_1$ onto $G_2$ that has the same period as $G_2$. Rays 8 from a point "h" project an image of $G_1$ onto $G_2$ that has a shorter period. Because these two do not exactly correspond, the system response is reduced. We define the upper limit of the measurement volume as the scattering height at which the phase of the projection of $G_1$ onto $G_2$ differ by one half cycle over the aperture diameter. The lower limit is similarly defined.

Mathematically, note that the angle between adjacent ray from the upper and lower limits are given by $$\theta_\pm = \frac{\lambda_1}{h \pm \frac{1}{2}\Delta h} = \frac{\lambda_2\left(1 \mp \frac{1}{2N_1}\right)}{h \pm \frac{1}{2}\Delta h + s}$$

where the upper sign denotes the upper limit and the lower sign the lower limit. Solving for the spatial resolution, it is found that for the two cases $$\pm \frac{1}{2} \Delta h = \frac{\pm \frac{\lambda_T h}{2D}}{1 \mp \frac{\lambda_T}{2D}}$$

or $$\frac{\Delta h}{h} \approx \frac{1}{N_T}$$

where $N_T$ is the number of cycles of the difference grating across the aperture. This last approximation is good when $N_T$ is much larger than two.

Therefore, the two-spatial filter receiver responds to turbulence whose wavenumber is the difference of the receiver spatial filter wavenumbers and that is at a height given by the receiver filter separation divided by the fractional difference in the filter wavenumbers. The fractional height resolution is the inverse of the number of cycles of the receiver difference wavenumber across the aperture. The wind velocity is found by noting that the turbulence is swept past the receiver by the wind so that a turbulent wavenumber $K_T$ will produce an angular frequency out of the receiver of $\omega = v.K_{96}$, where v is the velocity. The velocity component parallel to $K_T$ is therefore given by $\omega/K_T$. In the absence of velocity fluctuations and detector noise, the spectral width is determined by the range of wavenumber values that the $\Delta\omega/\omega = 1/N_T$.

We claim:

1. A single-ended dual spatial filter detector, using a wide range of natural or artificial light sources or transmitters, for passive measurement of winds and turbulence aloft, said detector comprised of:

means for collimating the light source, said collimating means placed in front of a means for spatially filtering the incident light;

means for spatially filtering the light incident upon said spatially filtering means, said spatially filtering means located coaxially along the path of the light, and positioned behind the collimating means;

means for collecting the spatially filtered light, said collecting means collecting the irradiance fluctuations that are generated by said spatially filtering means;

means for detecting the spatially filtered light, said detecting means detecting the irradiance fluctuations that are generated by said spatially filtering means;

means for amplifying the signal generated by said detecting means, said amplifying means transmitting a signal to a means for analyzing the interference pattern created by said spatially filtering means, and; means for analyzing the interference pattern created by said spatially filtering means to measure phase perturbations between the light source and means for spatially filtering the light.

2. A single-ended dual spatial filter detector, as recited in claim 1, wherein the means for collimating the light received from the light source is a telescope, said telescope focussed at infinity.

3. A single-ended dual spatial filter detector, as recited in claim 1, wherein the means for spatially filtering the incident light is comprised of a pair of gratings, said gratings located coaxially along the path of light.

4. A single-ended dual spatial filter detector, as recited in claim 1, wherein the means for collecting the spatially filtered light is comprised of a collecting lens.

5. A single-ended dual spatial filter detector, as recited in claim 1, wherein the means for detecting the spatially filtered light is comprised of a photodetector.

6. A single-ended dual spatial filter detector, as recited in claim 1, wherein the means for analyzing the interference pattern created by the gratings is comprised of a spectrum analyzer.

* * * * *